(No Model.)
L. SELGRATH.
TAP BUSH FOR BARRELS.
No. 332,445. Patented Dec. 15, 1885.
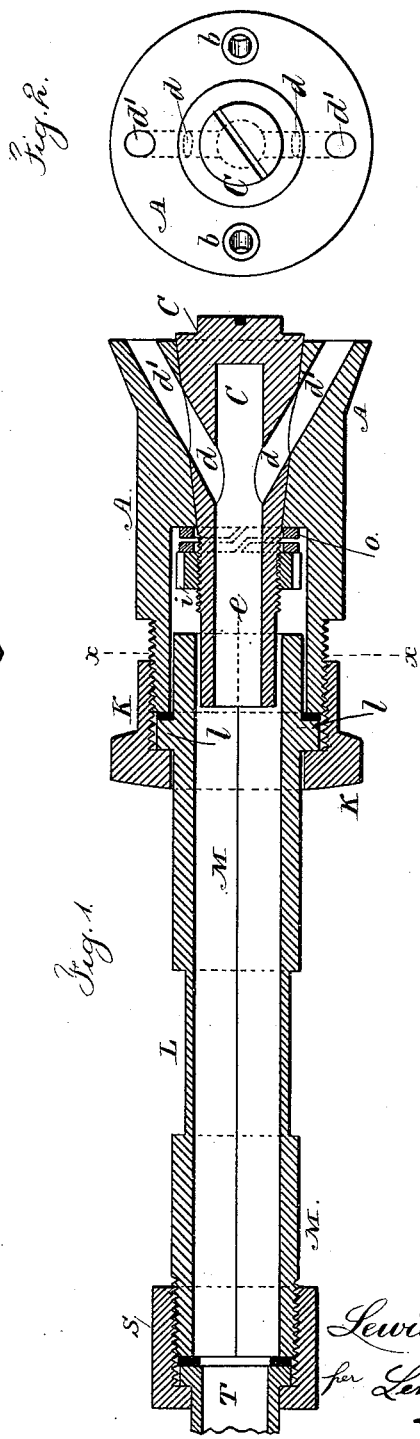

UNITED STATES PATENT OFFICE.

LEWIS SELGRATH, OF NEW YORK, N. Y.

TAP-BUSH FOR BARRELS.

SPECIFICATION forming part of Letters Patent No. 332,445, dated December 15, 1885.

Application filed September 14, 1885. Serial No. 177,011. (No model.)

*To all whom it may concern:*

Be it known that I, LEWIS SELGRATH, of the city and State of New York, have invented an Improvement in Tap-Bushes for Ale-Barrels, of which the following is a specification.

This invention is for allowing a barrel containing ale or similar liquid to be tapped without loss of the liquid and without admitting air to the barrel.

I make use of a bush containing an axial conical plug, with a screw and nut to retain the same in the bush, and with a central and diverging passages, in combination with a tubular key, that is removably connected to the bush by a coupling, so that when the barrel is in place the tubular key is connected to the bush by the coupling, so as to be air and liquid tight, and from the tubular key a hose or other flexible pipe passes to the place where the ale is drawn, and when the connections are complete the tubular key is turned to open the cock and allow the ale to pass through the cock and the tubular key to the pipe leading to the delivery bib or cock, thus preventing loss of ale and excluding the atmosphere from the contents of the barrel.

In the drawings, Figure 1 is a longitudinal section of the tap complete for use, and Fig. 2 is an end view of the inner end, and Fig. 3 is a section at the line $x$ $x$, Fig. 1.

The bush A is adapted to be fitted into a hole through the barrel-head. Its exterior may be made tapering or with a tapering or flanged inner end, and is either formed with spiral threads or ribs, so as to be pressed into the wood, or else screws at $b$ are passed through the flange at the back of the bush A into the wood to screw the bush to the head. The interior of this bush is tapering to receive the plug C, which plug is hollow or tubular at its smaller end $e$, and there are diagonal and lateral holes $d$ $d'$ passing in through the inner end of the bush and through the plug into the center of the tubular portion of said plug C, so that when the holes $d$ in the plug C are in line with the holes $d'$ in A, as in Figs. 1 and 2, the ale can pass through the same and be discharged from the tubular end $e$ of the plug, and when the holes $d$ and $d'$ do not coincide the plug C forms the cock and shuts off the discharge of the ale. The nut $i$ upon the tube $e$ and the spring $o$ serve to hold the plug C in place and make the parts tight when the holes do not coincide.

Around the outer end of the bush A there is a screw-thread, and I provide a tubular key, M, the interior of which receives the polygonal or flattened end $e$ of the plug A, and hence said cock can be opened by partially revolving the key M; or, by the reverse movement, the plug can be turned to close the cock. There is a flange, $l$, around the outer part of the tubular key, said flange being adjacent to the end of the bush, a washer intervening, and the screw union or coupler $k$, that is screwed upon the end of the bush, makes a tight joint between the tubular key and the bush, but allows the tubular key to be turned. Near the middle of the tubular key there is a polygonal portion or square, L, upon which a wrench is placed to turn the key and plug, and at the back end of the tubular key is a screw coupling or union, S, by which the delivery-pipe T is connected to the tubular key.

It will be now understood that the bush and tapering plug are permanently connected to the barrel, and that when a barrel is to be tapped or opened the tubular key is slipped over the end of the plug, the screw-coupling K tightened, and the pipe T extended to the bib or place of delivery, and after these connections are complete the tubular key is partially revolved, in order that the holes in the plug may be made to coincide with the holes in the bush, to open the bush for the discharge of the contents of the barrel. The pressure of the liquid against the larger end of the tapering plug tends to keep the same tight.

I claim as my invention—

The bush A and means for securing the same into the barrel, in combination with a tapering axial plug having a polygonal projecting end and diverging passages and inserted from the inner end of the bush, a washer and nut within the bush, a tubular key fitting the end of the plug, a flange thereon, and a screw coupling-ring around the tubular key, screwed upon the bush to retain the key upon the plug and allow the rotation of the key and plug, substantially as set forth.

Signed by me this 11th day of September, A. D. 1885.

LEWIS SELGRATH.

Witnesses:
 GEO. T. PINCKNEY,
 WALLACE L. SERRELL.